United States Patent Office 2,892,730
Patented June 30, 1959

2,892,730

SOLUTION OF HIGH MOLECULAR WEIGHT LACQUER FILM FORMER CONTAINING OXIDES OF SILICON, ALUMINUM, AND TITANIUM

Harry Kloepfer, Frankfurt, and Otto Schweitzer, Konigstein, Germany, assignors to Deutsche Gold- und Silber-Scheideanstalt vormals Roessler, Frankfurt am Main, Germany No Drawing. Application May 19, 1955, Serial No. 509,680. In Germany December 31, 1948

Public Law 619, August 23, 1954
Patent expires December 31, 1968

4 Claims. (Cl. 106—193)

The present invention relates to improvements in solutions of high molecular weight film formers in organic solvents and more particularly relates to such solutions in which oxides of metals or metalloids of a particular character have been incorporated to improve the properties of such solutions and the films produced therefrom.

High molecular weight film formers which are dissolved in organic solvents are employed in many different ways in industry. For example, they can be employed as adhesives, films, foils, lacquers, paints, stretching lacquers (dopes) and the like. For such purposes, the following can be employed as the high molecular weight film formers: nitro cellulose, cellulose acetate, chlorinated rubber, polyvinyl acetate, polyacrylic esters, cellulose butyrate, cellulose propionates and the like. Depending upon the field of application, various other materials are admixed with such film formers, such as, for example, plasticizers, natural or synthetic resins including hardenable resins, mineral pigments, fillers, fibrous materials, such as, textile or cellulose fibers, for example, in the production of adhesives and the like.

These mixtures, depending upon their field of application, often exhibit certain disadvantages, for example, in thinly viscous easily sprayable and spreadable adhesive compositions essentially formed of solutions of high molecular weight film formers in organic solvents any mineral fillers present often settle out after only standing for a short period of time. The resulting sediments tend to solidify or cohere to such an extent upon standing that it often is difficult or impossible to redisperse them in the solution by stirring. The same difficulty also occurs in lacquers or paints which must be rather thinly liquid to permit proper application.

In the production of stretching lacquers (dopes), a number of high molecular weight film formers, such as, polyvinyl chlorides, polyvinyl chloride mixed polymerizates and the various chlorinated rubbers, have been found unsuitable, as they do not possess sufficient stretching capacity, despite the fact that their non-combustibility would render them very desirable for use in aeroplanes.

In accordance with the invention, it was unexpectedly discovered that the incorporation of finely divided metal or metalloid oxides which have been produced in a particular manner not only can serve to increase the viscosity or consistency of solutions of high molecular weight film formers in organic solvents but will also retard or substantially avoid sedimentation of solids contained in such solutions. Furthermore, it was found that the incorporation of such finely divided oxides in solutions of high molecular weight film formers will improve the stretching capacity of such film formers so that film formers previously unusable for the production of dopes can be used therefor.

The special metal or metalloid oxides employed according to the invention are produced by a gas phase thermal decomposition of volatile metal or metalloid compounds in a flame in the presence of combustible gases, preferably oxygen containing gases. The volatile metal or metalloid compounds are continuously supplied to the flame through a burner together with the combustible, preferably hydrogen containing or hydrogen forming and if necessary oxygen containing, gases at temperatures below the melting point of the oxide to be produced. The flame temperature and the velocity at which the gases are supplied to the flame are adjusted so that the oxides produced remain in the reaction zone as short a time as possible and that undesired surface changes, for example, crystallization of the oxide particles produced, are avoided. The reaction products are removed from the flame zone as quickly as possible and are cooled quickly to a temperature which is still above the dew point of the easily condensable volatile reaction products. During such cooling, the oxides which were formed as aerosols coagulate into aerogel form and such aerogels are collected, for example, with cyclones, filters, electric separators and the like, at temperatures which are still maintained above the dew point of the easily condensable by-products of the reaction. The oxides also can be collected on moving cooled surfaces, such as, for example, rotating drums provided with suitable stripping means to prevent the deposited oxides from reentering the flame zone.

The addition of the oxides produced as aerosols and collected as aerogels in the manner described above to adhesives will prevent sedimentation of specifically heavier fillers therefrom. For example, the addition of a few percent, for example, 2 to 5%, of such oxides to adhesives loaded with mineral fillers having a specific weight up to 100% more than the adhesive itself will prevent sedimentation of such mineral fillers.

An especially advantageous aerogel of the type described is the colloidal silica which is obtainable by thermal decomposition of volatile silicon compounds, such as, for example, silicon tetrachloride. Such highly disperse colloids behave in organic liquids in much the same manner as bentonite behaves in aqueous dispersions or emulsions. Adhesives containing larger quantities of the aerogels according to the invention are pasty. However, such pastes are thixotropic and upon mechanical agitation with only low energy requirements they are reconverted into a thinly liquid form which permits easy application.

The incorporation of the aerogel oxides according to the invention in adhesives of the type described renders it possible to load such adhesives with mineral fillers, even those of higher specific weight than the adhesives. The loading of such adhesives with high specific weight fillers, such as, barium sulfate, chromium oxide, zinc oxide and the like, surprisingly increases the adherence of the adhesive films to many different types of surfaces. This renders it possible to employ this measure, which had previously been used in aqueous adhesives, in organic solvent adhesives. It is of special advantage that the adhesives remain easy to apply despite such additions. The colloidal oxides employed according to the invention in themselves also to a certain extent improve the adherence of the adhesives to which they have been added.

The behavior of colloidal oxide aerogels according to the invention varies with different solvents. In hydrocarbons, for example, benzene or toluene and chlorinated hydrocarbons, such as, carbon tetrachloride or trichloroethylene, the gelatinizing action of, for example, silica aerogel, is especially strong, whereas in oxygen containing compounds, such as, ethyl acetate, butyl acetate, or alcohols such as methanol and butanol, the gelatinizing action is less pronounced. The gelatinizing action also to a certain extent depends upon the type of film former and plasticizer dissolved in the solvents. The increase in viscosity which is produced by the incorporation of the aerogel oxide according to the invention in adhesives is essentially retained at higher temperatures.

The oxide aerogels according to the invention also have a favorable influence on lacquers or paints based on high molecular weight film formers dissolved in organic solvents in that they hinder sedimentation. Such oxide aerogels which are obtained from the aerosols produced by the vapor phase thermal decomposition of volatile metal and metalloid compounds can be added to lacquers and paints in quantities of about 0.5% up to about 6% in addition to the usual ingredients, such as, plasticizers, natural or synthetic hardenable resins, pigments, fillers and the like. Preferably the elemental particle size of such aerogels is below $0.05\mu$ and advantageously below $0.01\mu$. The addition of such aerogels to lacquers or paints will retard and in some instances completely prevent the sedimentation of heavy fillers or pigments contained therein, such as, for example, chrome green, red lead, zinc oxide, basalt meal, barium sulfate and the like.

It is already known that extremely finely divided calcium carbonate can, for example, be produced by precipitation. The pastes resulting from the addition of such finely divided precipitate substances, however, are not thixotropic so that considerable quantities thereof can be added. For example, it is possible to produce pastes containing 40 to 50% of finely divided precipitated calcium carbonate. On the other hand, the upper limit of the addition of the aerogel oxides according to the invention to lacquers and paints is well below 10%. In the most highly dispersed qualities, the upper limit is already reached at about 4 to 5%. The liquids produced with about 6% of aerogel oxide according to the invention are distinctly thixotropic. A further difference in the aerogel oxides according to the invention which have an elementary particle size below $0.05\mu$ and preferably below $0.01\mu$ resides in their refractive indices. While the addition of different quantities of finely divided precipitated calcium carbonate considerably changes the color tone of lacquers or paints, the refractive index of the oxide aerogel additions according to the invention is so favorable that even with larger additions no change in color tone can be ascertained.

With smaller additions of, for example, about 1 to 2%, the structure of the sediments is only loosened. With somewhat larger additions of about 5 to 6% the formation of sediments is practically completely hindered. With the larger additions, the viscosity of the lacquers is increased and the lacquers to a certain extent become thixotropic. The oxide aerogels according to the invention therefore act in the organic phase similarly to bentonite in aqueous emulsions or dispersions.

The lacquers obtained according to the invention not only exhibit an increased viscosity but also increased stability without loss of ease of application.

As the elementary particles of the oxide aerogels according to the invention are usually weakly agglomerated, it is usually necessary to triturate the lacquer or concentrates thereof in a pigment rubbing mill or a roller mill to ensure sufficient fine dispersion of such oxides in the lacquer.

The following examples will serve to illustrate the advantageous properties of lacquers and paints produced according to the invention with the special oxides which have been produced as aerosols and collected as aerogels.

*Example 1*

A priming paint for protecting containers and iron structures against aggressive liquids and gases was prepared by triturating 100 parts of a 20% chlorinated rubber solutions in benzene, 5 parts linseed oil, 2 parts of a plasticizer, triphenylphosphate, 40 parts of red lead and 3.5 parts of silica aerogel according to the invention having an elementary particle size below $0.05\mu$. No sedimentation occurred even after 24 days' standing. In the absence of the silica aerogel, substantial sedimentation occurred after only 1 day.

*Example 2*

A red lead priming paint for the production of iron structures was prepared from 50 parts of linseed varnish, 150 parts red lead and 1.5 parts of silica aerogel according to the invention having an elementary particle size below $0.05\mu$. Light sedimentation occurred in such paint after four weeks' standing. Such sedimentation however could be redispersed by light stirring. In the absence of the silica aerogel according to the invention, heavy sedimentation occurred after 1 to 2 days.

*Example 3*

An aeroplane lacquer consisting of 7 parts nitrocellulose, 38.5 parts ester mixture, 19.3 parts alcohol mixture, 5 parts aromatic mixture, 6 parts resin, 4 parts plasticizer, 19 parts lithopone, 0.8 part pigment mixture and 3.5 parts silica aerogel according to the invention having an elementary particle size below $0.05\mu$ was prepared and its stability compared with the same lacquer except that the silica aerogel had been omitted. The following table compares the quantity of clear supernatant lacquer occurring after standing:

QUANTITY OF SUPERNATANT CLEAR LACQUER

|  | Without silica aerogel, percent | With silica aerogel, percent |
| --- | --- | --- |
| after 1 day | 8 | 0 |
| after 2 days | 15 | 0 |
| after 3 days | 20 | 0 |
| after 5 days | 30 | 0 |
| after 6 days | 34 | 0 |
| after 7 days | 38 | 0 |
| after 8 days | 44 | 0 |
| after 9 days | 49 | 0 |
| after 12 days | 61 | 3 |

The addition of the metal or metalloid oxides according to the invention which have been produced as aerosols and collected as aerogels to molecular weight film formers dissolved in organic solvents also provides the advantage that some high molecular weight film formers can be employed in the production of stretching lacquers which as indicated above could not be employed for this purpose in view of their low stretching power. According to the invention, a small proportion, about 5%, of the highly disperse oxide aerogels having an elementary particle size below $0.05\mu$, preferably under $0.01\mu$, are added to the lacquer base composed of high molecular weight film formers dissolved in organic solvents if desired, plasticizers and pigments. Such additions substantially increase the stretching power of film formers which in themselves are suited for the production of stretching lacquers, and will increase the stretching power of film formers which in themselves do not possess sufficient stretching power so that suitable stretching lacquers can be prepared therefrom. The colloidal silica aerogel collected from an aerosol produced by the vapor phase thermal decomposition of volatile silica compounds, such as, silicon tetrachloride, has been found most suited for this purpose. Highly disperse aluminum and titanium oxides produced in similar manner have analogous properties.

The addition of a few percent of these aerogel oxides, for example, about 1 to 2%, to organic solutions of high molecular weight film formers, for example, ordinary stretching lacquers, substantially increases their stretching power. Again it is advantageous if the oxide aerogels are triturated with the lacquers or lacquer concentrates to ensure proper dispersion of the aerogel elementary particles which usually are weakly agglomerated to larger particles. The stretching lacquers thus produced are more or less thixotropic, depending upon the quantity of aerogel oxide added.

The addition of the aerogel oxides according to the invention to usually employed stretching lacquers, such as, nitrocellulose stretching lacquers, renders it possible to incorporate larger quantities of plasticizers, especially difficultly combustible plasticizers such as tricresylphosphate, triphenylphosphate, trichlorophenyl phosphate or highly chlorinated hydrocarbons of low volatility without detriment to the stretching power and thereby lower the combustibility of the films produced.

In cellulose acetate stretching lacquers, it is possible to increase the quantity of water repellent plasticizers, such as triphenyl phosphate and tributyl phosphate, incorporated therein so as to decrease the cellulose acetate stretching lacquer's known sensitivity to moisture.

The most surprising discovery was that the aerogel oxide additions would lend stretching power to certain film formers, such as, polyvinyl chloride, rehalogenated polyvinyl chlorides and vinyl chloride mixed polymerizates, which in themselves have no stretching power or only insufficient stretching power. Some stretching power is even imparted to chlorinated rubber by the additions according to the invention.

The usual plasticizers, natural or synthetic resins, pigments and fillers can also be incorporated in the stretching lacquers according to the invention. In addition, solvents or mixtures can be employed in the new lacquer compositions which in addition to the normal proportion of solvents contain larger portions of non-solvents, such as, benzine and other hydrocarbons.

The following examples serve to illustrate the unexpectedly improved properties of stretching lacquers produced according to the invention.

*Example 4*

A lacquer of the following composition:

15.0 parts rechlorinated polyvinyl chloride
67.0 parts solvent ester mixture
18.0 parts aromatic mixture
0.3 part plasticizer
1.5 parts pigment was applied to an aeroplane covering material stretched on a frame. The quantity applied was 18 grams per square meter. After six months' weathering, the observed indentations caused by a 1 kg. load was 6.1 mm. and by a 0.5 kg. load was 4.0 mm.

When 1% of silica aerogel according to the invention having a particle size between $0.004\mu$ and $0.025\mu$ was incorporated in such lacquer, the observed indentations with 1 kg. and 0.5 kg. loads after six months' weathering respectively were 3.5 mm. and 2.0 mm.

*Example 5*

A lacquer of the following composition:

13 parts of alcohol wet nitrocellulose
31 parts of solvent ester mixture
36 parts of alcohol mixture
1.2 parts of plasticizer mixture
1.0 part silica aerogel according to the invention was applied to an aeroplane covering material stretched on a frame. After six months' weathering, the observed indentations with 1 kg. and 0.5 kg. loads respectively were 3.2 mm. and 2.0 mm.

*Example 6*

A lacquer of the following composition:

7.5 parts cellulose acetate of medium viscosity
23.0 parts solvent ester mixture
26.0 parts alcohol mixture
11.0 parts toluene
1.1 parts plasticizer
0.75 part silica aerogel according to the invention was applied to an aeroplane covering material stretched on a frame. After six months' weathering, the observed indentations with 1 kg. and 0.5 kg. loads respectively were 3.7 mm. and 2.2 mm.

We claim:

1. An improved solution of an organic high molecular weight lacquer film former in an organic solvent having dispersed therein about 0.5 to 6% of a finely divided oxide selected from the group consisting of silica, aluminum oxide and titanium oxide obtained by the decomposition of a volatile compound corresponding to such oxide in the vapor phase in a flame in the presence of combustible and oxygen containing gases to form an oxide aerosol and collecting such oxide as an aerogel at a temperature above the dew point of the easily condensable reaction by-products.

2. A solution according to claim 1 in which the dispersed finely divided oxide has a particle size below $0.05\mu$.

3. A solution according to claim 1 in which the dispersed finely divided oxide is silica produced by the vapor phase decomposition of silicon tetrachloride.

4. A solution according to claim 1 in which the quantity of finely divided oxide dispersed in the solution is about 2 to 6%.

References Cited in the file of this patent

UNITED STATES PATENTS

| | | |
|---|---|---|
| 2,180,145 | Harford | Nov. 14, 1939 |
| 2,608,545 | Warrick | Aug. 26, 1952 |
| 2,635,946 | Weber et al. | Apr. 21, 1953 |
| 2,717,214 | Marotta | Sept. 6, 1955 |

OTHER REFERENCES

Monsanto Chemicals and Plastics, 27th edition, pages 145–147 and 158.